United States Patent
Rao et al.

(10) Patent No.: US 12,083,980 B2
(45) Date of Patent: Sep. 10, 2024

(54) INTELLIGENT SEAT CUSHION

(71) Applicant: GM GLOBAL TECHNOLOGY OPERATIONS LLC, Detroit, MI (US)

(72) Inventors: Ramachandra M R Rao, Karnataka (IN); Pramod Joshi, Karnataka (IN); Naresh Kini, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 17/851,402

(22) Filed: Jun. 28, 2022

(65) Prior Publication Data

US 2023/0415692 A1    Dec. 28, 2023

(51) Int. Cl.
*B60R 21/207* (2006.01)
*B60N 2/427* (2006.01)
*B60N 2/90* (2018.01)

(52) U.S. Cl.
CPC ........ *B60R 21/207* (2013.01); *B60N 2/42718* (2013.01); *B60N 2/90* (2018.02); *B60N 2002/981* (2018.02)

(58) Field of Classification Search
CPC .......... B60N 2/42718; B60N 2002/981; B60N 2/42; B60N 2/99; B60N 2/91; B60N 2/646; B60R 21/207
See application file for complete search history.

(56) References Cited

U.S. PATENT DOCUMENTS

| | | | | | |
|---|---|---|---|---|---|
| 5,487,197 | A | * | 1/1996 | Iskra, Jr. | A47C 7/021 297/452.41 |
| 6,014,784 | A | * | 1/2000 | Taylor | A61G 7/05776 297/284.6 |
| 6,203,105 | B1 | * | 3/2001 | Rhodes, Jr. | B60N 2/806 297/284.6 |
| 6,216,299 | B1 | * | 4/2001 | Kohlman | A61G 7/05776 5/713 |

(Continued)

FOREIGN PATENT DOCUMENTS

| | | | | |
|---|---|---|---|---|
| DE | 20316865 U1 | 2/2004 | | |
| DE | 102016116935 A1 | * 3/2017 | ............... | B60N 2/20 |

(Continued)

OTHER PUBLICATIONS

German Office Action for German Application No. 102022127840.9; dated Oct. 2, 2024; 6 pages.

*Primary Examiner* — Timothy J Brindley
(74) *Attorney, Agent, or Firm* — CANTOR COLBURN LLP

(57) ABSTRACT

A seat assembly of a vehicle includes a seat cushion, and a plurality of inflatable tubes located in the seat cushion. An inflation apparatus is operably connected to the plurality of inflatable tubes to selectably inflate the plurality of inflatable tubes upon detection of a crash event. A method of operating a seat assembly of a vehicle includes detecting a crash event, and selectably inflating a plurality of inflatable tubes in a seat cushion of the seat assembly in response to detection of the crash event. One or more inflatable tubes may be (Continued)

provided in a seat back, headrest and/or side bolster of the seat assembly to enhance active and passive safety features and to improve occupant comfort. This feature can be extended to a seat backrest, seat bolster and seat headrest to enhance active and passive safety features.

19 Claims, 6 Drawing Sheets

(56) References Cited

U.S. PATENT DOCUMENTS

| | | | | |
|---|---|---|---|---|
| 6,668,405 | B1* | 12/2003 | Kohlman | A61G 5/1043 |
| | | | | 5/653 |
| 7,000,948 | B2* | 2/2006 | Little | B60R 21/01516 |
| | | | | 280/743.1 |
| 8,181,292 | B1* | 5/2012 | Pellettiere | B60N 2/4279 |
| | | | | 5/713 |
| 8,485,551 | B2* | 7/2013 | Dainese | B60R 21/207 |
| | | | | 280/730.2 |
| 9,174,604 | B2 | 11/2015 | Wellhoefer et al. | |
| 10,220,755 | B2* | 3/2019 | Shibata | B60N 2/665 |
| 11,623,597 | B1* | 4/2023 | Jost | B60N 2/665 |
| | | | | 280/735 |
| 2001/0011810 | A1 | 8/2001 | Saiguchi et al. | |
| 2002/0145512 | A1* | 10/2002 | Sleichter, III | B60N 2/56 |
| | | | | 340/407.1 |
| 2003/0038517 | A1* | 2/2003 | Moran | B60N 2/914 |
| | | | | 297/284.6 |
| 2004/0262888 | A1 | 12/2004 | Lochmann | |
| 2014/0265263 | A1* | 9/2014 | Shankar | B60R 21/207 |
| | | | | 280/728.2 |
| 2014/0361520 | A1* | 12/2014 | Hirako | B60N 2/42763 |
| | | | | 280/729 |
| 2015/0126916 | A1* | 5/2015 | Hall | A61H 9/0078 |
| | | | | 601/149 |
| 2016/0129920 | A1* | 5/2016 | Hall | B60N 2/665 |
| | | | | 701/1 |
| 2019/0389414 | A1* | 12/2019 | Masuda | B60R 21/207 |
| 2020/0307433 | A1* | 10/2020 | Nagasawa | B60N 2/914 |
| 2020/0398700 | A1* | 12/2020 | Migneco | B60N 2/002 |
| 2021/0094454 | A1* | 4/2021 | Humer | A47C 7/503 |

FOREIGN PATENT DOCUMENTS

| | | | | |
|---|---|---|---|---|
| EP | | 1710120 A2 * | 10/2006 | B60N 2/4415 |
| EP | | 2347937 A1 | 7/2011 | |
| WO | WO-2007055106 A1 * | | 5/2007 | B60N 2/42718 |

* cited by examiner

INTELLIGENT SEAT CUSHION

INTRODUCTION

The subject disclosure relates to vehicles, and more particularly to occupant seats for vehicles. Seat belts are utilized by vehicle occupants as safety devices to protect the occupants in the event of a crash. In some crash scenarios, however, the occupant's position in the seat shifts relative to the seat belt in a phenomenon called submarining. In such an event, the occupant's position shifts downward, so the load is transferred through the seat belt to relatively soft anatomical regions of the occupant such as the abdomen and the chest wall. This significantly reduces the effectiveness of the seat belt.

Accordingly, it is desirable to provide means to prevent or mitigate occupant submarining.

SUMMARY

In one embodiment, a seat assembly of a vehicle includes a seat cushion, a plurality of inflatable tubes located in the seat cushion, and an inflation apparatus operably connected to the plurality of inflatable tubes to selectably inflate the plurality of inflatable tubes upon detection of a crash event.

Additionally or alternatively, in this or other embodiments the inflation apparatus includes one or more tanks containing an inflation gas, and a controller operably connected to the one or more tanks to command inflation and/or deflation of the plurality of inflatable tubes via the one or more tanks.

Additionally or alternatively, in this or other embodiments a one-way valve is disposed at the controller to control inflation and/or deflation of the plurality of inflatable tubes.

Additionally or alternatively, in this or other embodiments the controller is operably connected to one or more vehicle sensors to determine the detection of a crash event.

Additionally or alternatively, in this or other embodiments the one or more vehicle sensors includes one or more of lidar, radar, camera, air bag or seatbelt sensors.

Additionally or alternatively, in this or other embodiments the plurality of inflatable tubes are configured to inflate to provide one or more alerts to an occupant of the seat assembly.

Additionally or alternatively, in this or other embodiments the one or more alerts include lane departure alerts, drowsy driving alerts, collision warning alerts or destination arrival alerts.

Additionally or alternatively, in this or other embodiments the plurality of inflatable tubes circulate a heating or cooling fluid therethrough.

Additionally or alternatively, in this or other embodiments the plurality of inflatable tubes extend from a common header tube.

Additionally or alternatively, in this or other embodiments the plurality of inflatable tubes extend parallelly to each other.

Additionally or alternatively, in this or other embodiments the plurality of inflatable tubes are arrayed in a grid pattern.

Additionally or alternatively, in this or other embodiments, the seat assembly includes one or more of one or more inflatable headrest tubes in a headrest of the seat assembly, one or more bolster tubes in a side bolter of the seat assembly, and one or more seat back tubes in a seat back of the seat assembly.

In another embodiment, a method of operating a seat assembly of a vehicle includes detecting a crash event, and selectably inflating a plurality of inflatable tubes in a seat cushion of the seat assembly in response to detection of the crash event.

Additionally or alternatively, in this or other embodiments the plurality of inflatable tubes are selectably inflated in response to a command from a controller operably connected to one or more tanks of inflation gas.

Additionally or alternatively, in this or other embodiments the inflation and/or deflation of the plurality of inflatable tubes is controlled via a one-way valve.

Additionally or alternatively, in this or other embodiments one or more alerts are provided to an occupant of the seat assembly via selective inflation or deflation of the plurality of inflatable tubes.

Additionally or alternatively, in this or other embodiments the one or more alerts include lane departure alerts, drowsy driving alerts, collision warning alerts or destination arrival alerts.

Additionally or alternatively, in this or other embodiments the crash event is detected via one or more of radar, lidar, camera or air bag sensors.

In yet another embodiment, a vehicle includes a vehicle body, and a seat assembly secured in the vehicle body. The seat assembly includes a seat cushion, a plurality of inflatable tubes located in the seat cushion, and an inflation apparatus operably connected to the plurality of inflatable tubes to selectably inflate the plurality of inflatable tubes upon detection of a crash event.

Additionally or alternatively, in this or other embodiments the plurality of inflatable tubes are configured to inflate to provide one or more alerts to an occupant of the seat assembly. The one or more alerts include lane departure alerts, drowsy driving alerts, collision warning alerts or destination arrival alerts.

The above features and advantages, and other features and advantages of the disclosure are readily apparent from the following detailed description when taken in connection with the accompanying drawings

BRIEF DESCRIPTION OF THE DRAWINGS

Other features, advantages and details appear, by way of example only, in the following detailed description, the detailed description referring to the drawings in which.

DETAILED DESCRIPTION

Figure 1:
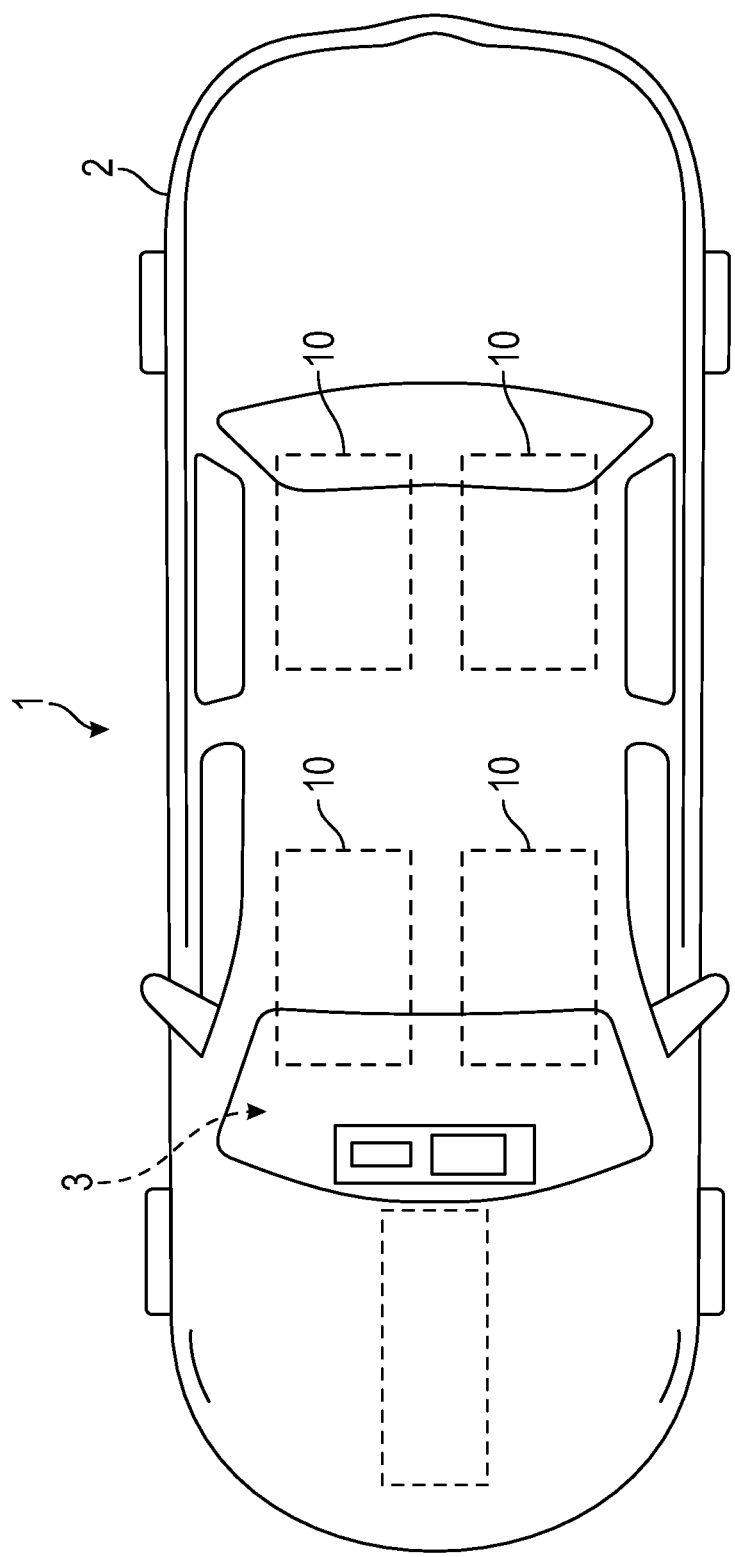
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates an embodiment of a vehicle 1. The vehicle 1 includes a vehicle body 2, which defines an occupant compartment 3 in an interior of the vehicle 1. One or more seat assemblies 10 are located in the occupant compartment 3.

Figure 2:
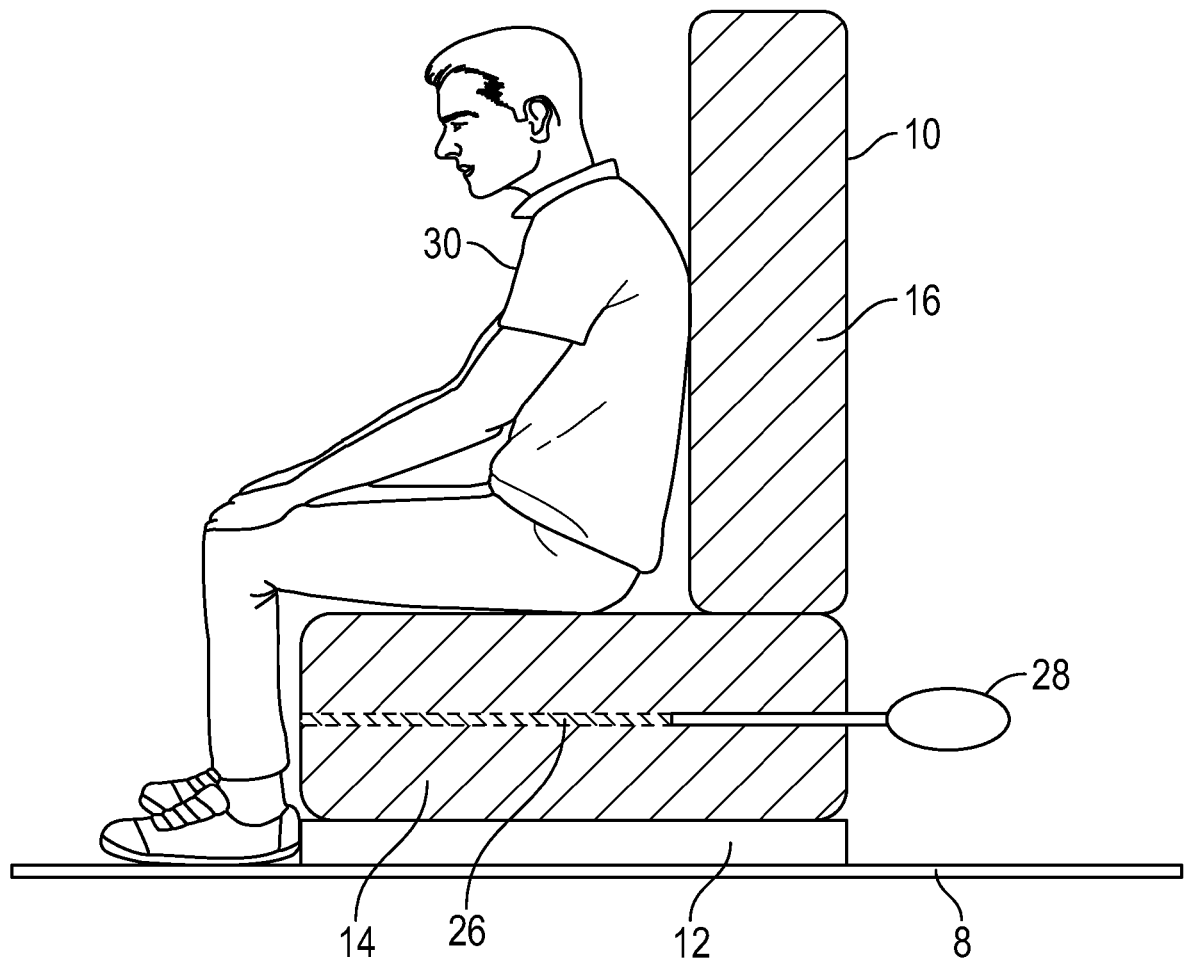
FIG. 2 is a side view of an embodiment of a seat assembly.
Figure 3:
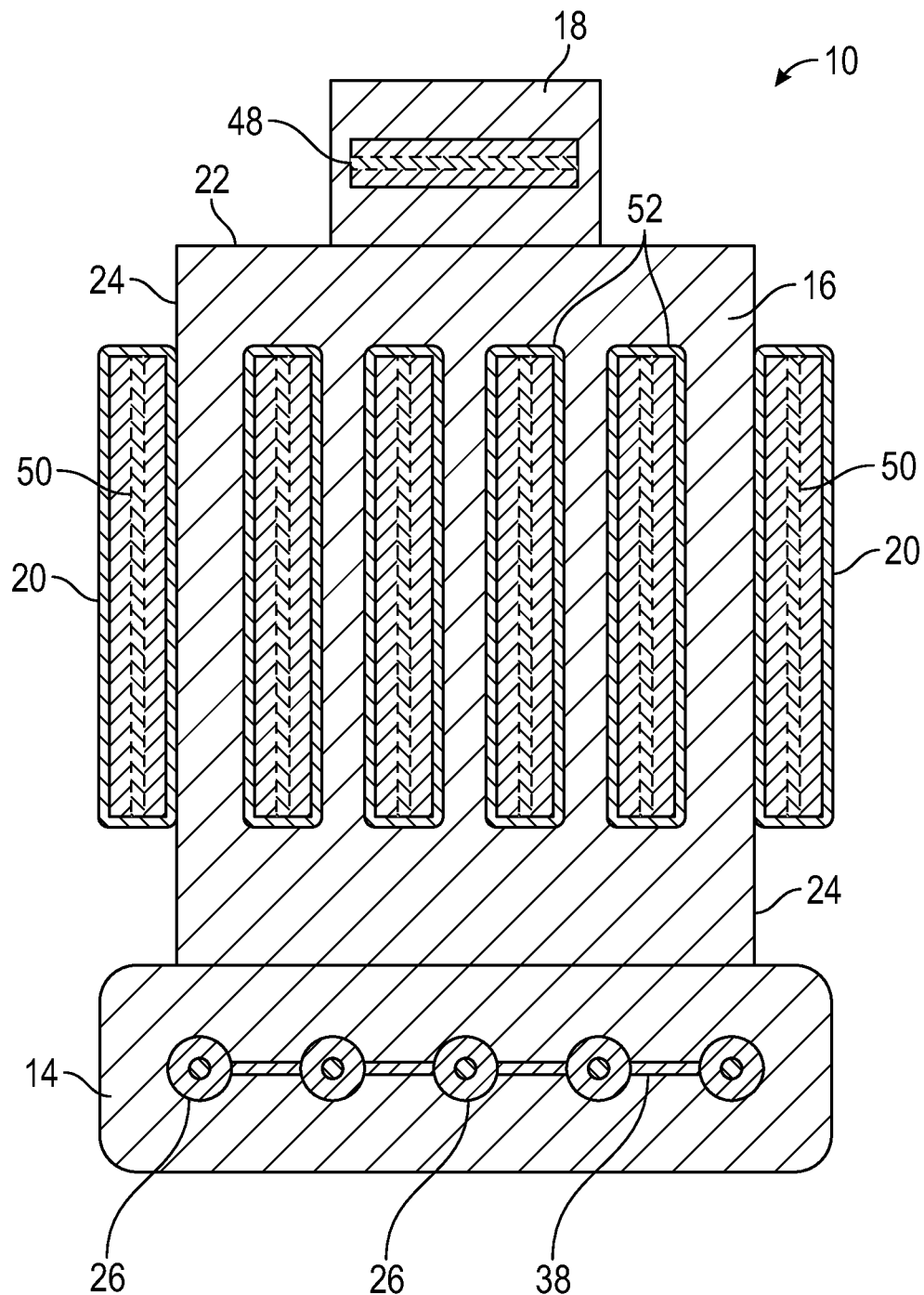
FIG. 3 is a front view of an embodiment of a seat assembly.

Referring now to FIG. 2, the seat assembly 10 includes a seat frame 12 serving as a support for the seat assembly 10 and as an attachment location for the seat assembly 10 to the vehicle body 2 (i.e. to a floor 8 of the vehicle body 2). Although described herein in the context of a front row driver or passenger seat, one skilled in the art will readily appreciate that the present disclosure may also be applied to other seats, such as second or third row seat assemblies 10 of the vehicle 1. A seat cushion 14 and a seat back 16 extending generally upwardly from the seat cushion 14. Referring now to FIG. 3, in some embodiments the seat assembly 10 includes a headrest 18 at a seat back top 22 of the seat back 16 and a seat side bolster 20 located at one or more seat back lateral sides 24 of the seat back 16.

Referring again to FIG. 2, one or more inflatable tubes 26 are embedded in the seat cushion 14, which can be inflated and deflated in a controlled manner, a process which may be controlled by, for example, AI-based algorithms. During a crash event, the inflatable tubes 26 are inflated with gas from a gas source 28 which results in stiffening of the seat cushion 14 and avoiding sinking of an occupant 30 in the seat cushion 14, thereby preventing submarining of the occupant in a crash event.

Figure 4:
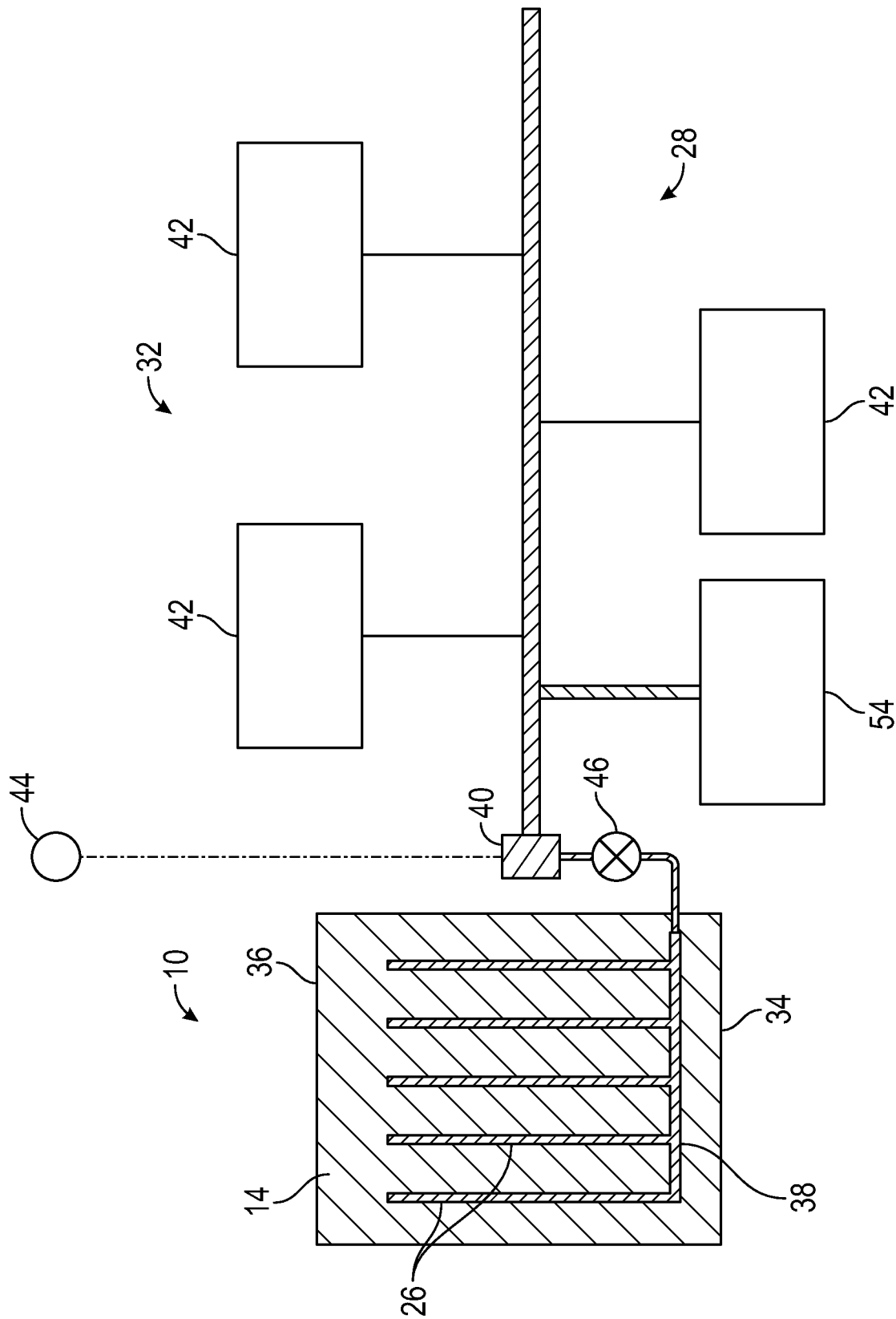
FIG. 4. is a top view of an embodiment of a seat cushion and inflation apparatus.
Figure 5:
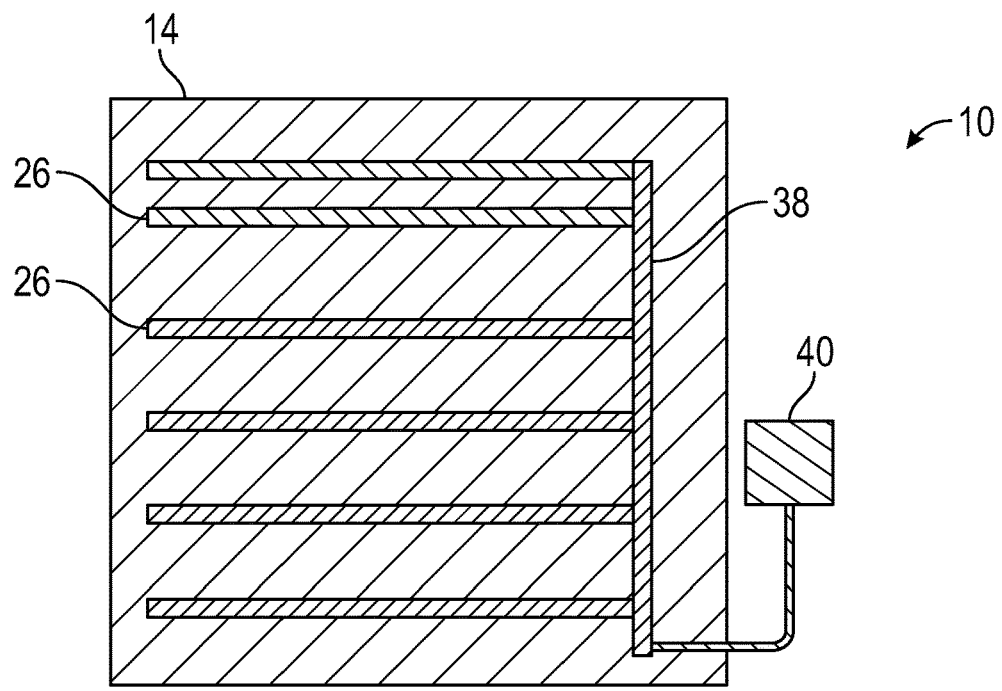
FIG. 5 is a top view of another embodiment of a seat cushion.
Figure 6:
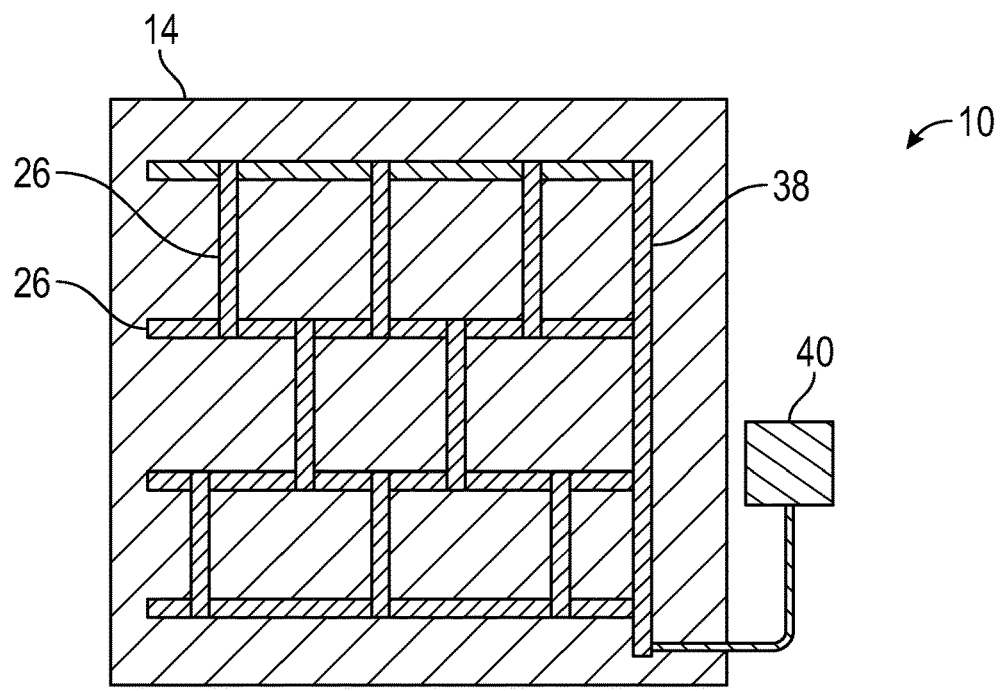
FIG. 6 is a top view of yet another embodiment of a seat cushion.

FIG. 4 illustrates an exemplary embodiment of a seat cushion 14 and an inflation apparatus 32. The seat cushion 14 includes a plurality of the inflatable tubes 26 therein, extending from a rear end 36 of the seat cushion 14 toward a front end 34 of the seat cushion 14. The plurality of inflatable tubes 26 extend from a common header tube 38 and are arranged in parallel and equally-spaced in the seat cushion 14. It is to be appreciated, however, that this arrangement is merely exemplary. In other embodiments, such as in FIG. 5, the inflatable tubes 26 are not equally spaced. Further, in some embodiments other arrangements of inflatable tubes 26, such as a grid pattern shown in FIG. 6, may be used. The pattern of the inflatable tubes 26 may be selected based on factors such as occupant comfort, and or inflation properties and crash performance of the seat assembly 10. Referring again to FIG. 4, the header tube 38 is connected to the inflation apparatus 32, which includes a controller 40 and the gas source 28. The gas source 28 may include a plurality of inflation gas tanks 42 containing, for example, compressed air, and the controller 40 commands and controls release of the compressed air from the gas tanks 42 to inflate the inflatable tubes 26. In some embodiments, the controller 40 includes a one-way valve 46, or a plurality of one-way valves 46, that allow for selectable filling and draining of the inflatable tubes 26.

To trigger inflation of the inflatable tubes 26, the controller 40 is connected to one or more vehicle sensors 44, such as lidar, cameras, radar, air bag or seatbelt sensors or other sensors, to detect a crash event. When the crash event is detected, the controller 40 initiates quick inflation of the inflatable tubes 26. In the event that one or more of the active safety sensors, such as lidar, cameras or radar, detects an imminent unavoidable crash event, the controller activates inflation of the inflatable tubes 26 prior to the occurrence of the unavoidable crash event. This quick inflation of the inflatable tube 26 prevents sinking of the occupant 30 in the seat cushion 14, to prevent submarining of the occupant 30 and thus improving the performance of the seat belt in preventing injury to the occupant 30. In some embodiments, a pyrotechnic device 54 or charge is utilized to trigger quick inflation of the inflatable tubes 26. When the pyrotechnic device 54 is activated, the expanding gasses from the activation quickly fill the inflatable tubes 26.

In addition to prevention of submarining of the occupant in a crash event, the inflatable tubes 26 may be utilized in additional ways. Referring again to FIG. 3, the headrest 18 may include headrest tubes 48 which may be selectably inflated to prevent occupant whiplash injuries in, for example, a rear impact or low speed crash. In addition to these operations, the selective inflation and deflation of the inflatable tubes 26 may be utilized in cooperation with other vehicle systems and sensors to signal the occupant as, for example, a lane departure warning, a drowsy driving warning, collision warning, or a destination reach alert feature in autonomous vehicles. In addition to such warnings and alerts, the inflatable tubes 26 may be utilized as a heating or cooling feature for the seat assembly by circulating either warm or cool air through the inflatable tubes 26.

In some embodiments, additional inflatable bolster tubes 50 may be located in the side bolsters 20 of the seat assembly 10, and seat back tubes 52 may be located in the seat back 16. The bolster tubes 50 may be inflated to support the occupant 30 during a side crash event and to provide a pre-crash warning as well as for cushioning or comfort of the occupant 30 during normal conditions. Further, the seat back tubes 52 may be inflated and deflated to form a pattern which can give a massaging effect to occupant 30. This patterning of airflow can also be done with the inflatable tubes 26 in the seat cushion 14 to convert seat assembly 10 into a massaging chair. Further, in some embodiments, the seat back tubes 52 may be selectably inflated to provide lumbar support to the occupant 30. Similarly, the inflatable tubes 26 in the seat cushion 14 may be selectably inflated to provide, for example, thigh support for the occupant 30.

Figure 7:
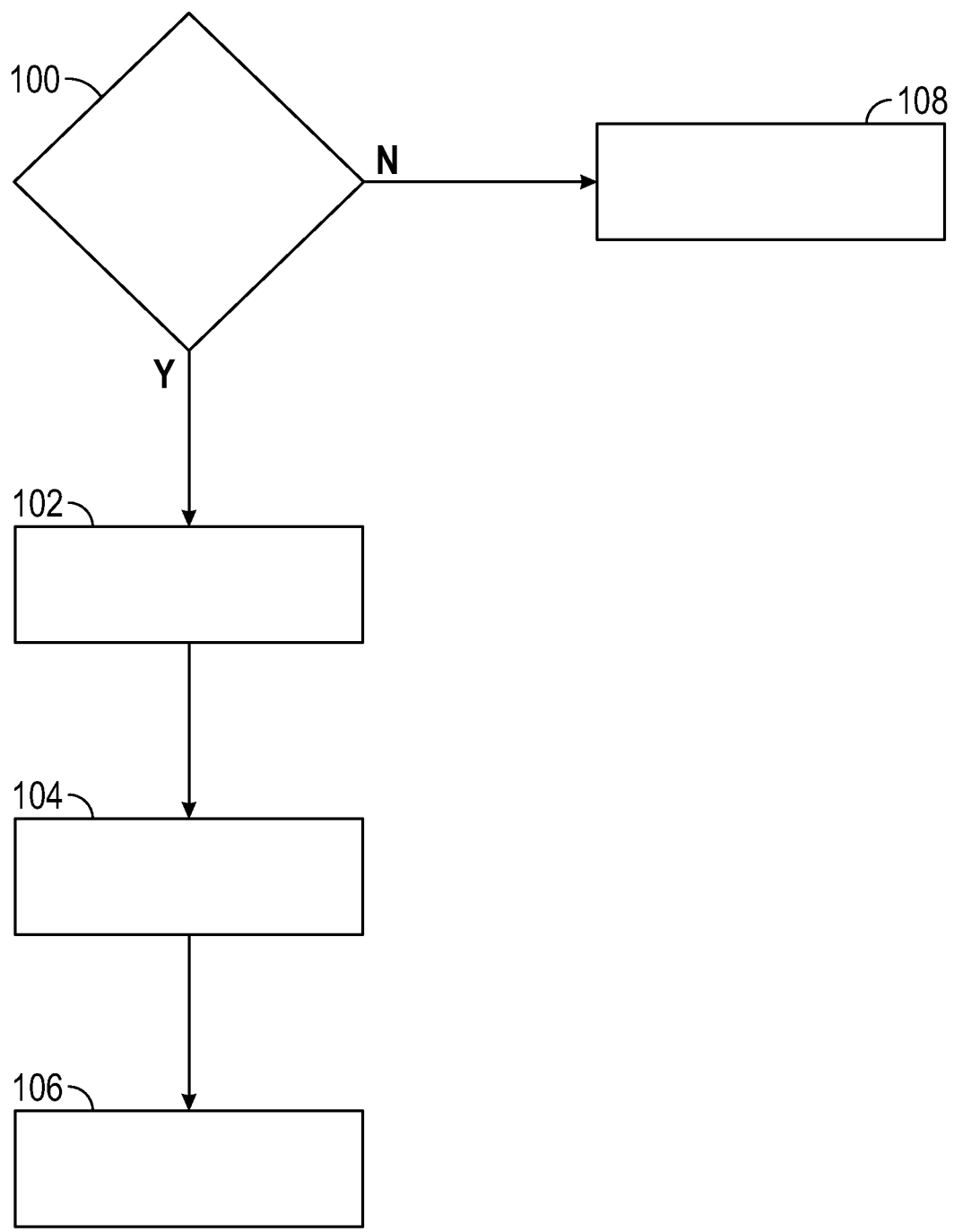
FIG. 7 is a schematic illustration of a method of operating a seat assembly.

Referring now to FIG. 7, a schematic of a method of operating a seat assembly 10 is illustrated. At block 100, a crash event or unavoidable impending crash event is detected by, the one or more vehicle sensors 44. At block 102, in response to the detection the controller 40 commands opening of the one-way valves 46 allowing for inflation gas to flow from the one or more gas tanks 42 at block 104. The plurality of inflatable tubes 26 are inflated at block 106 via the flow of inflation gas. At block 108, if no crash is detected, the seat tubes 26 may be selectively inflated to provide one or more alerts to the occupant 30.

The inflatable tubes 26 in the seat assembly 10 reduce the instance of submarining, thus reducing injury to the occupant in a crash event. Further, the inflatable tubes 26 can be utilized to provide feedback or alerts to the occupant in a variety of other scenarios and may be utilized to increase occupant comfort through heating or cooling.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A seat assembly of a vehicle, comprising:
a seat cushion;
a plurality of inflatable tubes disposed in the seat cushion; and an inflation apparatus operably connected to the plurality of inflatable tubes to selectably inflate the plurality of inflatable tubes upon detection of a crash event;
wherein the plurality of inflatable tubes are arranged in a grid pattern; and
wherein the grid pattern includes a plurality of intersections of the plurality of inflatable tubes.

2. The seat assembly of claim 1, wherein the inflation apparatus includes:
one or more tanks containing an inflation gas; and
a controller operably connected to the one or more tanks to command inflation and/or deflation of the plurality of inflatable tubes via the one or more tanks.

3. The seat assembly of claim 2, further comprising a one-way valve disposed at the controller to control one of inflation or deflation of the plurality of inflatable tubes.

4. The seat assembly of claim 2, wherein the controller is operably connected to one or more vehicle sensors to determine the detection of a crash event.

5. The seat assembly of claim 4, wherein the one or more vehicle sensors includes one or more of lidar, radar, camera, air bag or seatbelt sensors.

6. The seat assembly of claim 1, wherein the plurality of inflatable tubes are configured to inflate to provide one or more alerts to an occupant of the seat assembly.

7. The seat assembly of claim 6, wherein the one or more alerts include lane departure alerts, drowsy driving alerts, collision warning alerts or destination arrival alerts.

8. The seat assembly of claim 1, wherein the plurality of inflatable tubes circulates heating or cooling fluid therethrough.

9. The seat assembly of claim 1, wherein the plurality of inflatable tubes extend from a common header tube.

10. The seat assembly of claim 1, wherein the plurality of inflatable tubes extend parallelly to each other.

11. The seat assembly of claim 1, further comprising one or more of:
one or more inflatable headrest tubes in a headrest of the seat assembly; and
one or more bolster tubes in a side bolter of the seat assembly; and
one or more seat back tubes in a seat back of the seat assembly.

12. A method of operating a seat assembly of a vehicle, comprising:
detecting a crash event; and
selectably inflating a plurality of inflatable tubes in a seat cushion of the seat assembly in response to detection of the crash event;
wherein the plurality of inflatable tubes are arranged in a grid pattern; and
wherein the grid pattern includes a plurality of intersections of the plurality of inflatable tubes.

13. The method of claim 12, further comprising selectably inflating the plurality of inflatable tubes in response to a command from a controller operably connected to one or more tanks of inflation gas.

14. The method of claim 12, further comprising controlling one of the inflation or deflation of the plurality of inflatable tubes via a one-way valve.

15. The method of claim 12, further comprising providing one or more alerts to an occupant of the seat assembly via selective inflation or deflation of the plurality of inflatable tubes.

16. The method of claim 15, wherein the one or more alerts include lane departure alerts, drowsy driving alerts, collision warning alerts or destination arrival alerts.

17. The method of claim 12, further comprising detecting the crash event via one or more of radar, camera or air bag sensors.

18. A vehicle, comprising:
a vehicle body;
a seat assembly secured in the vehicle body including:
a seat cushion;
a plurality of inflatable tubes disposed in the seat cushion; and
an inflation apparatus operably connected to the plurality of inflatable tubes to selectably inflate the plurality of inflatable tubes upon detection of a crash event;
wherein the plurality of inflatable tubes are arranged in a grid pattern; and
wherein the grid pattern includes a plurality of intersections of the plurality of inflatable tubes.

19. The vehicle of claim 18, wherein the plurality of inflatable tubes are configured to inflate to provide one or more alerts to an occupant of the seat assembly, the one or more alerts including lane departure alerts, drowsy driving alerts, collision warning alerts or destination arrival alerts.

* * * * *